(12) United States Patent
Shah et al.

(10) Patent No.: US 11,552,919 B1
(45) Date of Patent: Jan. 10, 2023

(54) USER-DEFINED MESSAGE TIMELINES

(71) Applicant: Twitter, Inc., San Francisco, CA (US)

(72) Inventors: Jesar Shah, San Francisco, CA (US); David Gasca, San Francisco, CA (US); Tina Koyama, San Francisco, CA (US); Eric Frohnhoefer, San Francisco, CA (US); Svetlana Nelson, San Francisco, CA (US); Evan Sobkowicz, San Francisco, CA (US); Kate Lee, San Francisco, CA (US); Mateusz Dzwonek, San Francisco, CA (US); Kiyotoshi Yamauchi, San Francisco, CA (US); Adam Cummings, San Francisco, CA (US); Angad Singh, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 141 days.

(21) Appl. No.: 16/147,552

(22) Filed: Sep. 28, 2018

Related U.S. Application Data

(60) Provisional application No. 62/565,011, filed on Sep. 28, 2017.

(51) Int. Cl.
*H04L 51/52* (2022.01)
*G06F 3/04847* (2022.01)
(Continued)

(52) U.S. Cl.
CPC .......... *H04L 51/52* (2022.05); *G06F 3/04847* (2013.01); *H04L 51/216* (2022.05); *G06F 3/0482* (2013.01)

(58) Field of Classification Search
CPC .... G06F 3/0481; G06F 3/0485; G06F 3/0482; G06F 16/435
See application file for complete search history.

(56) References Cited

U.S. PATENT DOCUMENTS 8,171,128 B2  5/2012  Zuckerberg et al.
8,924,493 B1 *  12/2014  Yeskel ................ H04L 12/1813
                                                     709/206
(Continued)

FOREIGN PATENT DOCUMENTS

EP   2406732 B1   7/2015

*Primary Examiner* — William L Bashore
*Assistant Examiner* — Gregory A Distefano
(74) *Attorney, Agent, or Firm* — Fish & Richardson P.C.

(57) ABSTRACT

Methods, systems, and apparatus, including computer programs encoded on computer storage media, for creating and managing custom timelines. One of the methods includes receiving, from a user using a user account of a social messaging platform, input to a user interface displaying a message timeline of a social messaging platform, the user input requesting that the platform save a first message from the message timeline and, in response, saving the message to a custom timeline of the user account, wherein saving the message to the custom timeline includes associating with the custom timeline an identifier that identifies the first message; monitoring engagements by one or more other accounts with the first message with respect to one or more notification criteria; and in response to determining that the monitored engagements satisfy a trigger condition, providing a notification to the user account associated with the first message through the custom timeline.

24 Claims, 11 Drawing Sheets

(51) Int. Cl.
H04L 51/216 (2022.01)
*G06F 3/0482* (2013.01)

(56) References Cited

U.S. PATENT DOCUMENTS

| | | | |
|---|---|---|---|
| 10,684,738 B1* | 6/2020 | Sicora | G06F 3/04817 |
| 2007/0162432 A1* | 7/2007 | Armstrong | G06Q 50/01 |
| 2010/0169161 A1* | 7/2010 | Sacco | G06Q 50/01 |
| | | | 705/319 |
| 2011/0161987 A1* | 6/2011 | Huang | G06Q 10/10 |
| | | | 719/318 |
| 2012/0072272 A1 | 3/2012 | Kilar et al. | |
| 2013/0054517 A1* | 2/2013 | Beechuk | G06F 16/23 |
| | | | 707/E17.005 |
| 2013/0054714 A1* | 2/2013 | Bedi | H04L 51/16 |
| | | | 709/204 |
| 2013/0167168 A1 | 6/2013 | Ellis et al. | |
| 2013/0304822 A1* | 11/2013 | Tetreault | H04N 21/2187 |
| | | | 709/204 |
| 2014/0237387 A1* | 8/2014 | Ryall | G06F 16/9577 |
| | | | 715/753 |
| 2015/0169587 A1* | 6/2015 | Silverman | G06Q 30/0201 |
| | | | 707/751 |
| 2017/0061028 A1 | 3/2017 | Schoen et al. | |
| 2018/0314925 A1 | 11/2018 | Gauci et al. | |

\* cited by examiner

USER-DEFINED MESSAGE TIMELINES

CROSS-REFERENCE TO RELATED APPLICATIONS

This application claims the benefit under 35 U.S.C. § 119(e) of the filing date of U.S. Patent Application No. 62/565,011, for CUSTOM MESSAGE TIMELINES, which was filed on Sep. 28, 2017, and which is incorporated here by reference.

BACKGROUND

This specification relates to custom message timelines in a messaging platform.

A messaging platform can allow registered users to maintain social networking profiles and to build connections with each other. Conventional messaging platforms include features that allow users to post messages, view messages, and build connections with other user accounts. Typically, a user can view a message timeline that includes an ordered stream of messages authored by others and visible to the user.

Often users of a messaging platform do not have time to consume content at that moment. For example, a user may not have time to spend consuming the content or the user may want to wait until they have a different network connection, e.g., higher bandwidth or lower cost. However, because of the transient nature of the message feed, it may be difficult to find the same content at a later time. In some message platforms, users can indicate approval of a message, e.g., by "liking" the message. This typically allows the user to find the message again based on their prior activity. However, the liking action by the user is public to others viewing the message.

SUMMARY

This specification describes techniques for creating and managing custom, or user-defined, timelines in a messaging platform. A user of a messaging platform can select particular messages, e.g., from a message feed, and save them to the user-defined timeline. This custom timeline can be later viewed by the user, e.g., as a separate message feed including the messages saved to the custom timeline. Engagements with saved messages by other accounts of the messaging platform can be monitored by the messaging platform. When particular triggering conditions are satisfied by the engagements, a notification can be provided to the user including, e.g., information associated with the engagement or a prompt to view the saved message.

Saved messages and content associated with saved messages, e.g., video or audio content, can be cached for offline viewing by the user of the custom timeline. The custom timeline can remain private or the user can share a particular custom timeline with specifically designated accounts. In some implementations, the user can specify a particular custom timeline to receive messages posted by particular accounts. For example, the user can subscribe or follow a particular account on the messaging platform. Messages posted by that account can be automatically saved to the designated custom timeline.

In general, one innovative aspect of the subject matter described in this specification can be embodied in methods that include the actions of receiving, from a user using a user account of a social messaging platform, a user input to a user interface displaying a message timeline associated with the user account of the social messaging platform, the user input requesting that the social messaging platform save a first message from the message timeline and, in response to the user input, saving the message to a custom timeline of the user account, wherein saving the message to the custom timeline includes associating with the custom timeline an identifier that identifies the first message; monitoring engagements by one or more other accounts of the social messaging platform with the first message with respect to one or more notification criteria; and in response to determining that the monitored engagements satisfy a trigger condition for one or more of the notification criteria, providing a notification to the user account associated with the first message through the custom timeline.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes responsive to a user request to view the custom timeline, providing the custom timeline for presentation to the user, wherein providing the custom timeline includes retrieving content associated with the identifiers for the messages saved to in the custom timeline and assembling an ordered message stream comprising messages saved to the custom timeline. The method includes receiving user input specifying notification parameters for messages saved to the custom timeline; and determining whether the monitored engagements satisfy the trigger condition according to the user specified notification parameters. The method further includes receiving a request to share the custom timeline with a specified account of the messaging platform; and sharing, with the specified account, the custom timeline including the first message and all other messages saved to the custom timeline. Sharing the custom timeline provides equal modification rights to the custom timeline to the specified account as to the first user. The request to save the message comprises a request to subscribe to messages posted by an authoring account of the message, the subscription request designating the custom timeline as a destination for saving messages posted by the authoring account. The messaging platform dynamically maintains a context of each saved message, each context for a respective message including engagements with the message by one or more accounts of the social messaging platform. In response to a request to display the custom timeline, presenting the first message with current engagement information.

The subject matter described in this specification can be implemented in particular embodiments so as to realize one or more of the following advantages. In contrast to actions to refer back to a message at a later date that are public, for example, liking or reposting, a user can save a message for later consumption to a custom timeline without making that action public to other users. This enhances the privacy of user actions. Context for saved messages can be maintained and the user can be notified of specified changes in a conversation associated with a saved message. The user can later share one or more saved messages with other users. In some implementations, saved messages are cached, including any associated content, for offline viewing by the user. In some other implementations, subscribed content can be auto-populated to a designated custom timeline allowing a user to automatically collect posts from a source of interest.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
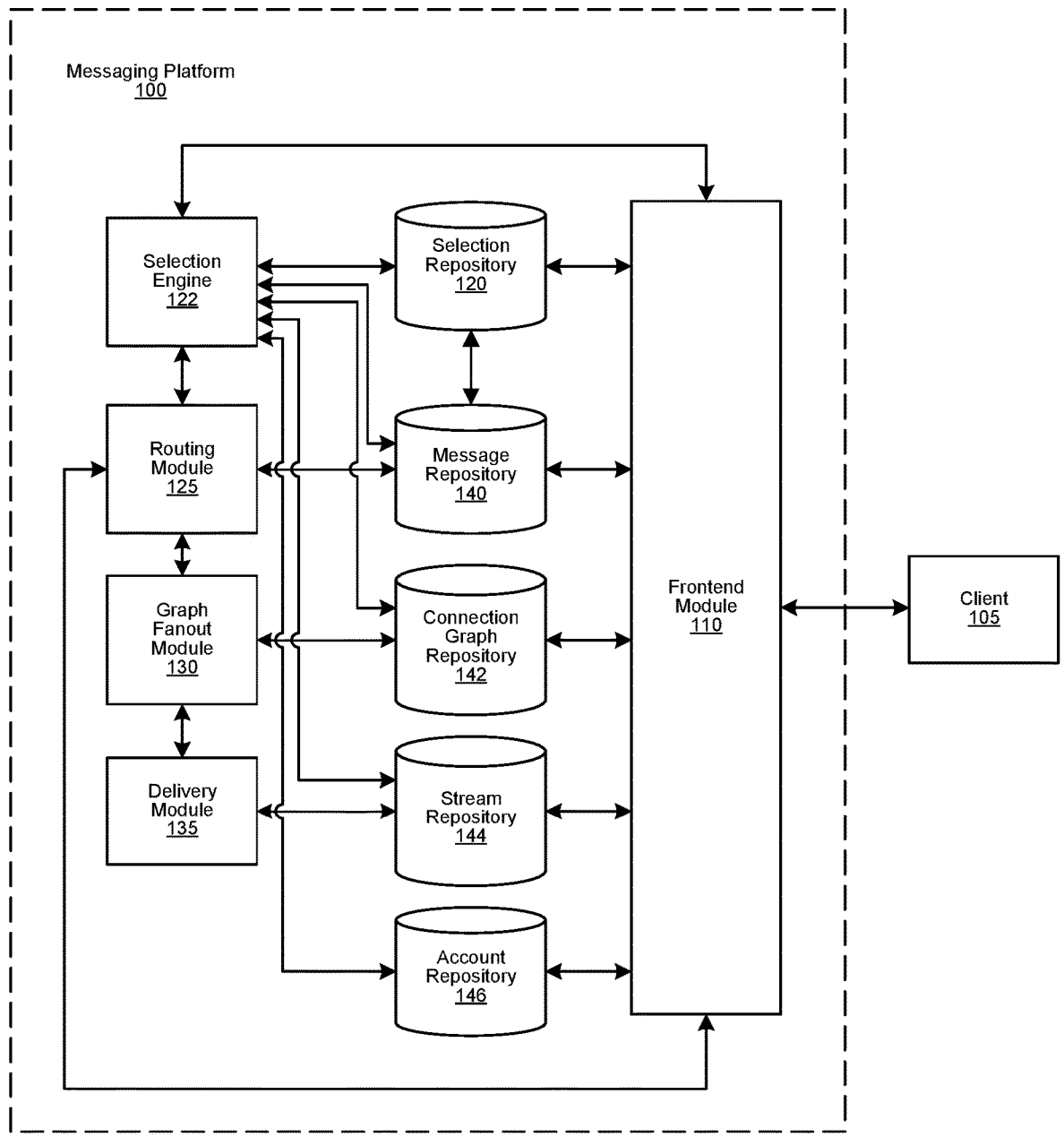
FIG. 1 is a block diagram of an example messaging platform.

FIG. 1 is a block diagram of an example messaging platform. In particular, FIG. 1 shows a messaging platform 100 and a client 105. As shown in FIG. 1, the messaging platform 100 has multiple components including a frontend module 110, a selection engine 122, a routing module 125, a graph fanout module 130, a delivery module 135, a selection repository 120, a message repository 140, a connection graph repository 142, a stream repository 144, and an account repository 146. Various components of the messaging platform 100 can be located on the same device, e.g., a server, mainframe, desktop Personal Computer (PC), laptop, Personal Digital Assistant (PDA), telephone, mobile phone, kiosk, cable box, or other device, or can be located on separate devices connected by a network, e.g., a local area network (LAN), or the Internet.

The messaging platform 100 is a platform for facilitating real-time communication between one or more entities. For example, the messaging platform 100 may store millions of accounts of individuals, businesses, and/or other entities, e.g., pseudonym accounts, or novelty accounts. One or more users of each account may use the messaging platform 100 to send messages to other accounts inside and/or outside of the messaging platform 100. The messaging platform 100 may be configured to enable users to communicate in "real-time", to converse with other users with a minimal delay and to conduct a conversation with one or more other users during concurrent sessions. Thus, the messaging platform 100 may allow a user to broadcast or post messages and may display the messages to one or more other users within a reasonable time frame so as to facilitate a live conversation between the users. Recipients of a message may have a predefined graph relationship with an account of the user broadcasting the message.

In one or more implementations, the messaging platform 100 connects users to other users, e.g., as user accounts, of the messaging platform 100, exchanges social networking messages between connected users of the messaging platform 100, and provides an interface for a user to create and view social network messages. The users that receive message posted by another user may be self-selected, e.g., followers of the transmitting user, or users that satisfy a certain status with the transmitting user, e.g., belong to a group, friend, or family.

In one or more implementations, the connection graph repository 142 is configured to store one or more connection graphs. The connection graph 150 includes multiple components including nodes representing accounts of the messaging platform 100 and edges connecting the various nodes.

The connection graph 150 is a data structure representing relationships between one or more accounts. The connection graph 150 represents accounts as nodes and relationships as edges connecting one or more nodes. A relationship may refer to any association between the accounts, e.g., following, friending, subscribing, tracking, liking, or tagging. The edges of the connection graph 150 may be directed and/or undirected based on the type of relationship.

The messaging platform 100 includes functionality to broadcast streams of messages to one or more accounts based at least partially on the connection graph representing relationships between those accounts. A stream may be a dynamic list of messages associated with one or more accounts or can reflect any arbitrary organization of messages that is advantageous for the user of an account. For purposes of this disclosure, a "message" can include a user authored message as well as other content e.g., images, audio, or video, posted by an account of a messaging platform.

In some implementations, the routing module 125 includes functionality to receive one or more social networking messages and to store the social networking messages in the message repository 140. The routing module 125 may include functionality to assign an identifier to the social networking message and to provide identification of a sender of the social networking message to the graph fanout module 130.

In some implementations, the graph fanout module 130 includes functionality to retrieve graph data from the connection graph repository 142 and to use the graph data to determine which user accounts in the messaging platform 100 should receive the social networking message. The graph data, for example, may reflect which user accounts in the messaging platform are "following" a particular account and are, therefore, subscribed to receive social networking messages from the particular user account.

In some implementations, the delivery module 135 includes functionality to receive a list of user accounts from the graph fanout module 130 and the message identifier generated by the routing module 125 and to insert the message identifier into stream data associated with each identified account. The delivery module 135 may then store the message list in the stream repository 144. The stream data stored in the stream repository 144 may constitute one or more streams associated with one or more user accounts of the social network application 100. A stream may be a dynamic list of social networking messages associated with one or more user accounts or may reflect any organization of social networking messages that is advantageous for the user of an account.

In some implementations, the frontend module 110 is a software application or a set of related software applications configured to communicate with external entities, e.g., client 105. The frontend module 110 may include the application programming interface (API) and/or any number of other components used for communicating with entities outside of the messaging platform 100. The API may include any number of specifications for making requests from and/or providing data to the messaging platform 100. For example, a function provided by the API may provide artist/song recommendations to a requesting client 105.

In some implementations, the frontend module 125 is configured to use one or more of the data repositories, e.g., message repository 140, connection graph repository 142, stream repository 144, discovery repository 148, or account repository 145, to define streams for serving social networking messages to a user of the account on the messaging platform 100. A user may use any client 120 to receive the social networking messages. For example, where the user uses a web-based client to access the messaging platform 100, an API of the frontend module 125 may be utilized to define one or more streams or to serve the stream data to the client for presentation to the user. Similarly, different forms of message delivery may be handled by different modules in the frontend module 125.

In some implementations, one or more of the data repositories is a database and/or storage service residing on one or more servers. For example, one or more of the data repositories may be implemented as a storage service using service-oriented architecture (SOA) and configured to receive requests for data and to provide requested data to other components of the messaging platform 100. In another example, the message repository 140 may include one or more tables in a distributed database management system (DBMS), a clustered database, a standalone flat file, or any suitable storage software residing on one or more physical storage devices.

In some implementations, one or more of the data repositories is a separate application or set of applications residing on one or more servers external, and communicatively coupled, to the messaging platform 100. Alternatively, in some implementations, one or more of the data repositories may be an integrated component of the messaging platform 100 or may reside, either partially or entirely, on one or more hardware devices, e.g., a server.

In some implementations, the selection repository 120 may store messages, e.g., social networking messages, and message metadata, e.g., social networking message metadata, associated with a message stream for a context account. The messages may include additional associated content such as audio, video, and images. Further, the message metadata may include tracking information to determine whether a message is viewed or unviewed by the context account. In one or more embodiments, the message metadata may include tracking information to identify the status of a message as viewed or unviewed. In addition, the tracking information may include recorded engagement history between users.

In some implementations, the message repository 140 includes functionality to store messages and message metadata. The message metadata may include an identifier of the broadcasting/posting user account of the social networking message, a list of users that received the social networking message, a number of users that received the social networking message, statistics, e.g., a ratio of following user accounts to the posting user account that forward the social networking message to non-following user accounts to the posting user account that forward the social networking message, time and date in which the social networking message is transmitted, or other information.

In some implementations, the connection graph repository 142 may store information about users. Specifically, the connection graph repository may relate user identifiers of a user to user's preferences and history in the social network application 100. For example, the user preferences and history may include language preferences, following user accounts of a user account, topics that a user account is interested in, and any other information.

Figure 2:
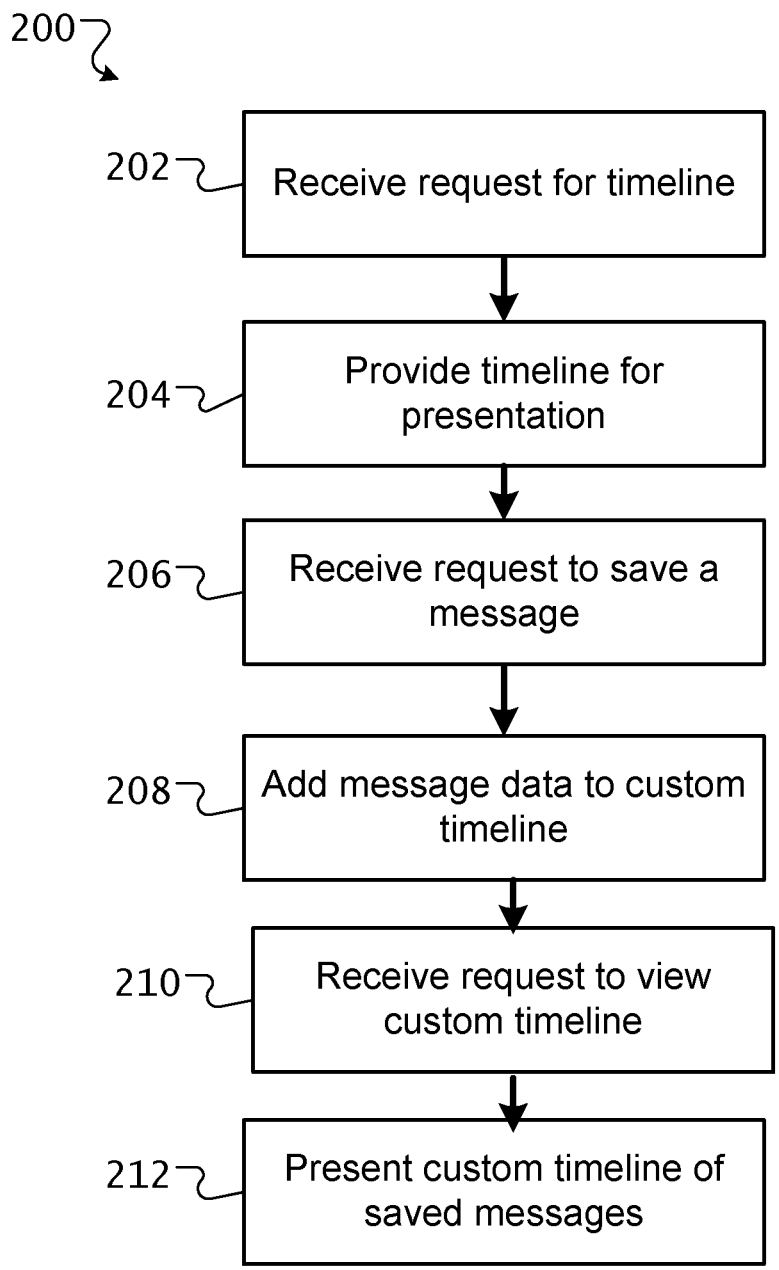
FIG. 2 is a flow diagram of an example process for creating a custom timeline.

FIG. 2 is a flow diagram of an example process 200 for creating a custom timeline. For convenience, the process 200 will be described as being performed by a system of one or more computers, located in one or more locations, and programmed appropriately in accordance with this specification. For example, a messaging platform, e.g., the messaging platform 100 of FIG. 1, appropriately programmed, can perform the process 200.

The system receives a request from a user to present a timeline (202). For example, a user can initiate access the message platform through an application or web page, e.g., by opening the corresponding application on a mobile device or pointing a browser application to the corresponding web address.

In response to the request, the system provides a home timeline for presentation (204). In some implementations, the system provides the home timeline after verifying user login information. For example, the user can provide login information before being presented with the timeline. Alternatively, a prior login can be maintained so that the user does not need to enter it upon the request.

The home timeline can present a stream of messages. The stream of messages can be presented according to particular ordering and/or ranking techniques. For example, the stream of messages can be provided in reverse chronological order such that the most recent message is at a top of the timeline. The stream of messages include messages authored by accounts of the messaging platform that the user is associated with. For example, the messages can be posted by accounts that the user has selected to "follow" or otherwise subscribe.

The system receive an input indicating a request to save a particular message for later (206). Various user interface elements can be used to provide the request. For example, a menu can be presented in response to particular user interaction with a given message. The menu can include the option to save the message. Example user interfaces for saving a message are described below with respect to FIGS. 3A-3G.

In some implementations, the message as viewed in the home timeline may no longer be available at the time the user requests to save the message. For example, the message may have been deleted by the author or removed by the system in the time since the home timeline was last refreshed. In that situation, the system may notify the user that the message cannot be saved, and optionally provide further details on why the message is no longer available. In some implementations, partial content of the message can be saved. For example, any combination of the content of the message (e.g., text, emojis, GIFs, images, live streams, video clips, and audio clips) may be removed, but the user can save the rest of the message along with information about the authoring user and the existing engagement history. Additionally, replies to the message may be preserved even if the content of the original message is not available. When not all aspects of the message and engagement information is available, the system generates an instance of the user-defined timeline in which whatever content available is displayed and, optionally, provide for the messages an indication that previously available aspects of the message is no longer available.

The system adds particular message data associated with the selected message to a custom timeline of saved messages (208). For example, an identifier of the message can be added to a data structure for the custom timeline. Additionally, the selected message can be indexed and maintained such that it can be retrieved using the identifier, for example, upon request to view the custom timeline. For example, a data structure defining a custom timeline can include message identifiers for each message added to the custom timeline. Upon a request to retrieve the custom timeline, the messages identifiers can be used to retrieve the message from a message repository, e.g., message repository 140. For example, a message index can include a content pointer for each indexed message identifier. The pointer identifies a location in the message repository for content associated with the message. This content can include the message itself as well as information about the message, for example, engagement statistics for the message. In some implementations, the index further includes data identifying associated message identifiers, for example, message identifiers for messages that are replies to a given message.

In some implementations, the system may tag messages which have been saved a threshold number of times, or at a threshold rate, as an indication of popularity of the message in a similar manner to engagement activity with the message. Thus, if a message is saved to a number of different user's custom timelines, this can be an extra indication of whether a message is trending in addition to user likes, replies, or reposts. Additionally, the types of messages saved by a user can be an indication of interests associated with the user account. For example, if a user saves a number of messages associated with cars, the system may associate the user with that interest. The interest can be used in determining recommended content for the user.

Moreover, the number of times a particular message has been saved (i.e., selected for inclusion in the user-defined timeline) is optionally tallied and inputted into a machine learning model to predict popularity, engagement, and interest. Suitable implementations of machine learning models may include classifiers, support vector machines, Bayesian networks, and neural networks and may be configured for supervised learning, semi-supervised learning, or unsupervised learning. Also optionally, the system uses the act of saving a message as a trigger to detect an impression—that the message has been viewed by the user—which detected impression the system is able to use measure the effectiveness of promoted content, including ads conversion tracking.

A particular API can be implemented to allow for the addition of particular messages to the custom timeline and to provide a read path for viewing the messages saved to the custom timeline. The API can be used to access a timeline service that is configured to write and retrieve message data to one or more of a storage system dataset or a cache. These storage locations can include one or more indexes that are used to retrieve the particular messages of the custom timeline as needed using, for example, a particular identifier for the message associated with the custom timeline or a pointer to content associated with a particular message identifier.

A custom timeline differs from the home timeline in several ways. The custom timeline is a timeline that has content specifically controlled by the user and that can be exclusively viewed by the user rather than be made public. In some implementations, the user can specifically name a custom timeline and can have multiple custom timelines.

Furthermore, the user can specify various parameters to apply to the custom timeline or to individual messages within the custom timeline. For example, the user can specify what kinds of activity with respect to an individual message or the custom timeline as a whole should trigger a notification. Notifications are described in greater detail below. In some other implementations, the parameters can include sharing parameters allowing the user to specify particular accounts to share the custom timeline with. Sharing of timelines is described in greater detail below.

The custom timeline can present the saved messages in reverse chronological order based on when the message was first broadcasts on the messaging platform, reverse chronological order based on when the messages were saved to the custom timeline, or a ranked order based on one or more ranking criteria. The ranking criteria can include, for example, user specified preferences, learned characteristics of the user, or a relationship between the user and the authoring account of the saved message, e.g., based on the connection graph.

Each of the ranking criteria can be assigned a particular weight indicating its importance to the ranking. Based on the ranking criteria and associated weights, a score can be generated for each message in the custom timeline. The scores can then be used to rank the messages. In some implementations, a prediction component can be used as a ranking criteria. The prediction component can provide predictions on whether or not the user is likely to engage further with each message.

In some other implementations, the messages saved to the custom timeline are placed in the order that they were saved rather than the order in which the messages were posted to the messaging platform. For example, when presenting the custom timeline the message can be presented from oldest saved message to newest or from newest saved message to oldest.

Each custom timeline can be associated with a particular network address such that the entire custom timeline can be shared with one or more other users. For example, the custom timeline can be shared with one or more selected accounts of the messaging platform, to individuals whether they have accounts or not, or to the general public.

In addition to the saved messages, the custom timeline can be associated with particular metadata and stored, for example, in a properties data structure for the custom timeline. The metadata can include a name and description of the custom timeline, the network address for the custom timeline, and timestamps for saved messages. Additionally, the metadata can include visibility and privacy settings for the custom timeline as well as one or more of the custom timeline parameters for notifications and sharing described above. Based on the privacy settings, the custom timeline can be private or made publically accessible.

The system receives a request from the user to view the custom timeline (210). For example, the request can be received at a later time during the same user session or in a different user session. The user interface, for example presenting the home timeline, can include a selectable element for presenting the custom timeline, for example, a "bookmarks" menu item.

In response to the request, the system provides the user device with data that is used by the user device to present the custom timeline (212). The custom timeline can include each of the messages previously saved by the user. The messages can be presented in reverse chronological order based on when the messages were broadcasted or posted on the messaging platform or based on when the messages were saved. In some other implementations, the saved messages can be separated by categories assigned to the messages, for example, as specified by the user or by the system in response to message analysis.

In some implementations, a message saved to the custom timeline may no longer be available at the time the user requests to view the custom timeline. For example, a message can be deleted by the author or removed by the messaging platform, e.g., for policy violations. Since the custom timeline stores message identifiers, the source message content may be un-retrievable when generating the custom timeline. When providing the custom timeline, the system can ignore a removed message such that the timeline is generated without the removed message.

Alternatively, a notification or placeholder entry can be provided with the custom timeline indicating that the message is no longer available. In some implementations, a reason for the removal can be provided, for example, removed as spam or other prohibited reason, or that the message was deleted by the authoring user. In some implementations, a notification can be provided to the user when an action is taken on the saved message. For example, the user can receive a notification that a message has been removed or deleted.

In some implementations, instead of a single message, a group of two or more messages may be saved to a custom timeline. For example, some content on the messaging system can be presented as a collection of content, for example as set of multiple message about a given topic. This entire collection of content can be saved to a custom timeline for later retrieval in a similar manner to that described above with respect to saving a single message. However, in this case the entire collection of content may have its own unique identifier that can be used to retrieve the collection, or the system may associate each of the individual message identifiers for the messages in the collection with the custom timeline.

FIGS. 3A-3G are illustrations of example user interfaces for adding a message in a message feed to a custom timeline.

Figure 3A:
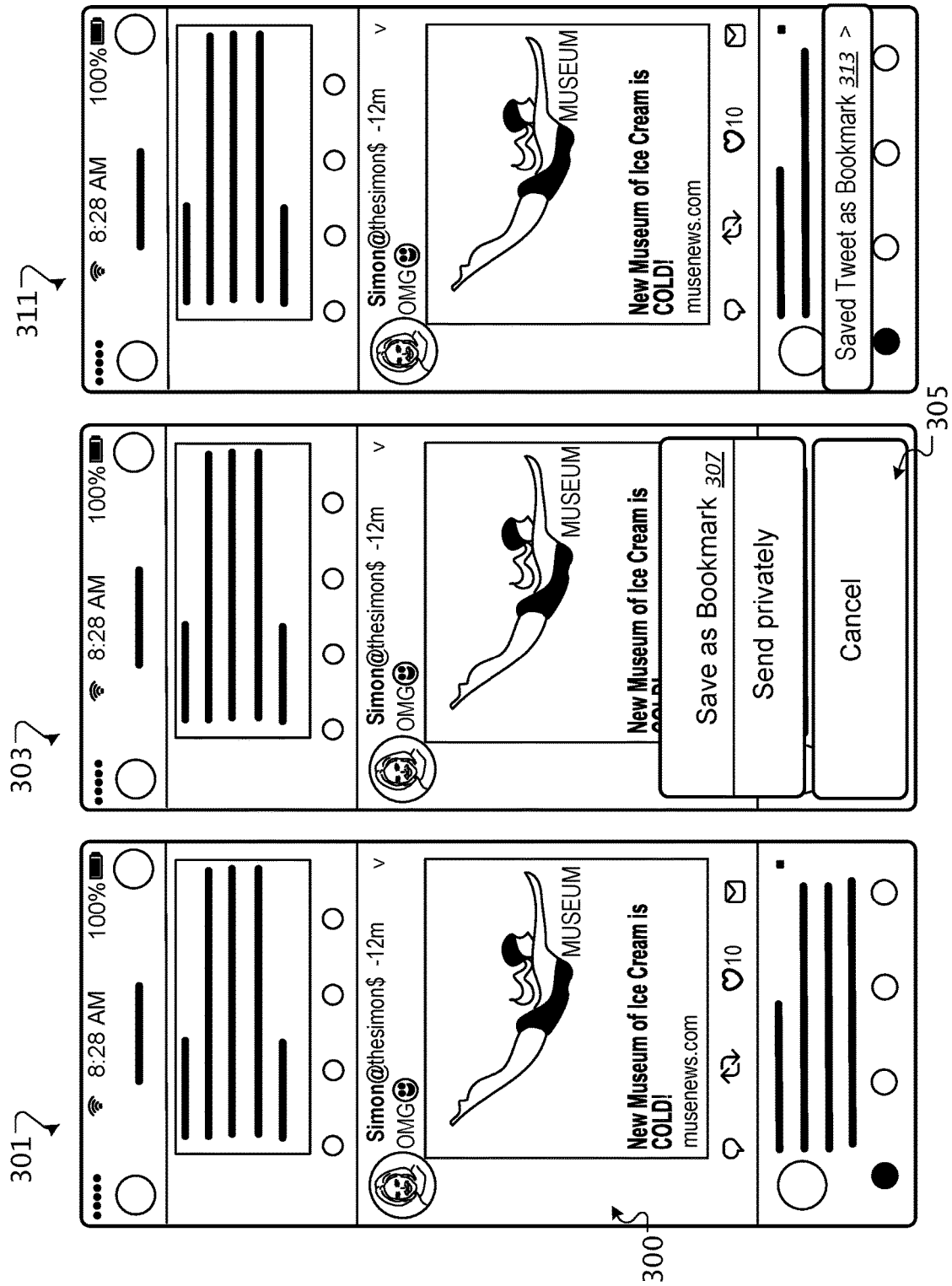
FIGS. 3A-3G are illustrations of example user interfaces for adding a message in a message feed to a custom timeline.

FIG. 3A is an illustration of example user interfaces for adding a message in a message feed to a custom timeline. FIG. 3A shows a first user interface 301 including several messages in a message stream of a timeline. FIG. 3A also shows a second user interface 303 including a selection menu 305. The selection menu 305 is presented in response to a user selection of a message, for example, by touching the message 300 on a touchscreen interface or selecting the message with a cursor. The selection menu 305 includes an option to save the message to a custom timeline. In the example shown, the menu item is "save as bookmark" 307. FIG. 3A also shows a third user interface 311 including an example notification 313 indicating that the operation is complete. In particular, after selecting the menu item in the second user interface 303, the interface can return to the previously shown message feed of the first user interface 301. Notification 313, in this case a banner notification, can indicate that the operation to save the message is complete.

Figure 3B:
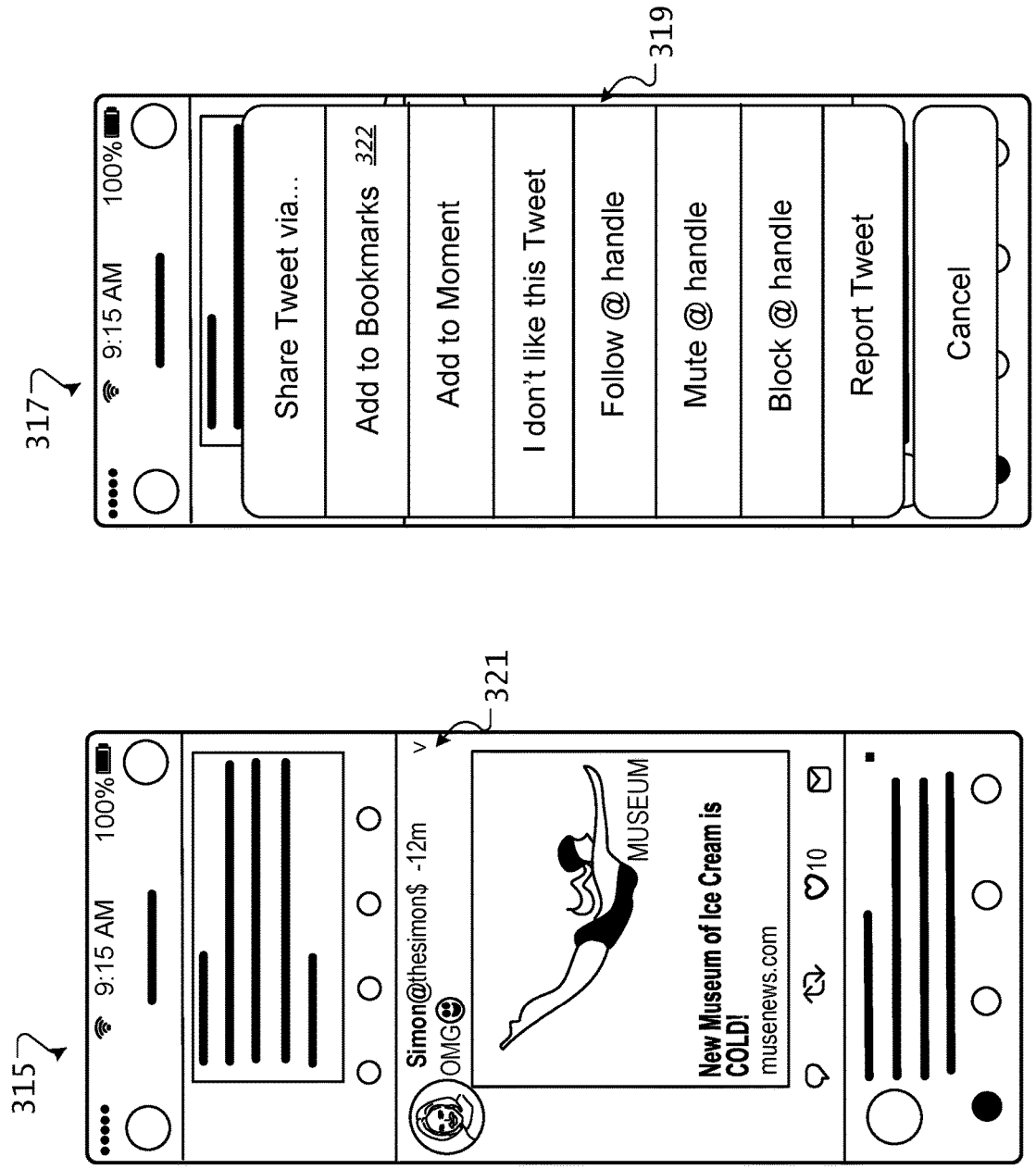

FIG. 3B is an illustration of example user interfaces for adding a message in a message feed to a custom timeline. In FIG. 3B, a first user interface 315 displays several messages in a message stream of a timeline. FIG. 3B shows a second user interface 317 including a selection menu 319. The selection menu can be presented in response to a user selection of a particular user interface element. In particular, as shown in FIG. 3B, the user selects the caret 321 for a message in the message stream shown in the first user interface 315. The selection menu 319 displayed in response, as shown in the second user interface 317 includes a number of options including an option to save the message to a custom timeline, e.g., with the "add to bookmarks" menu option 322.

Figure 3C:
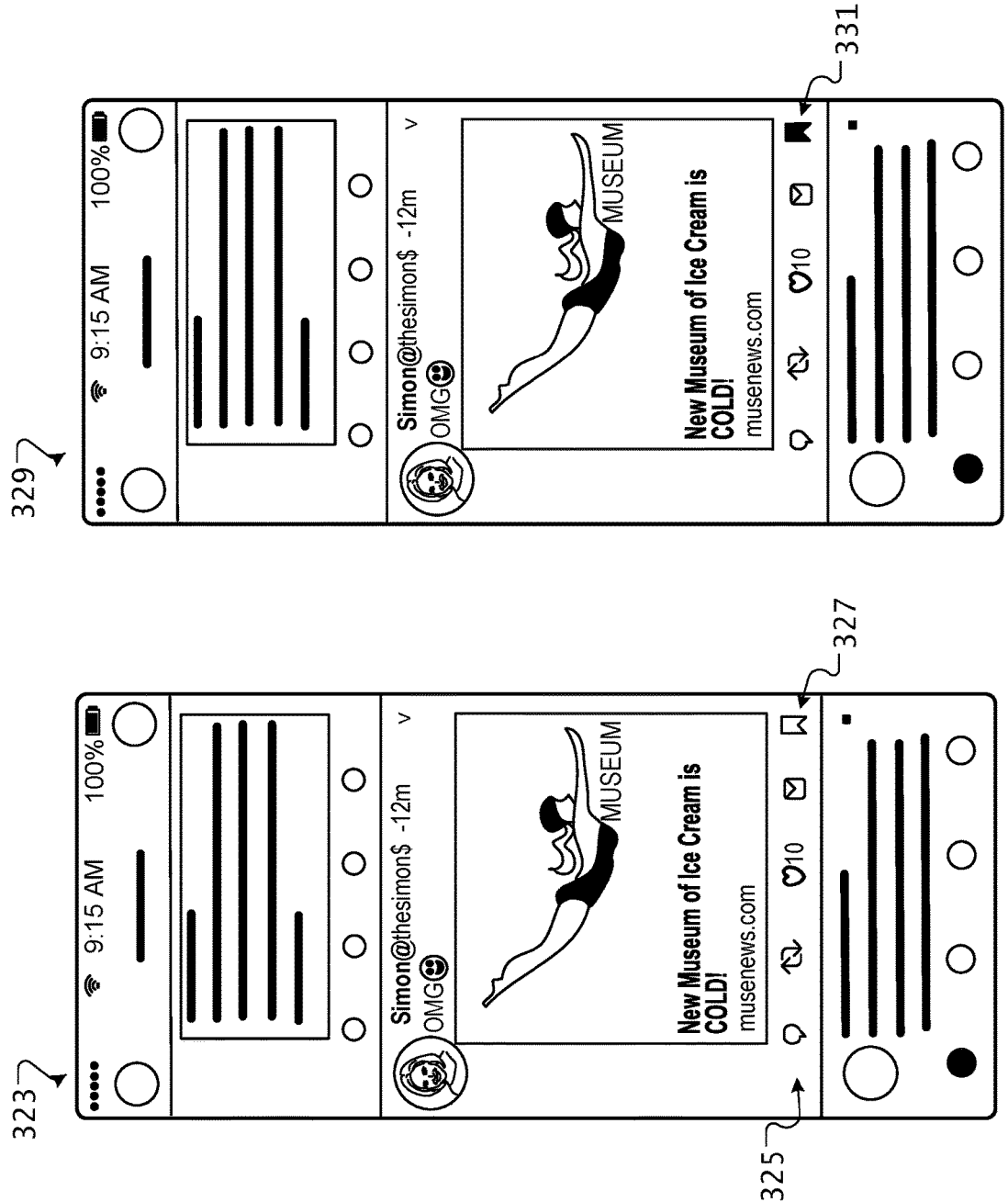

FIG. 3C is an illustration of example user interfaces for adding a message in a message feed to a custom timeline. In FIG. 3C, a first user interface 323 displays several messages in a message stream of a timeline. A number of user interface elements 325 indicating particular user actions are displayed below the content of a message, for example, to comment on the message, rebroadcast or repost the message, or like the message. The user interface elements 335 also include a bookmark element 327 that indicates the message is saved to a custom timeline. In some implementations, other user actions can be displayed, for example, to share the message or to select from particular custom timelines for saving the message. As shown in FIG. 3C, a second user interface 329 illustrates the selected bookmark element 331, which can be visually distinct from the unselected bookmark element 327 to indicate the selection.

Figure 3D:
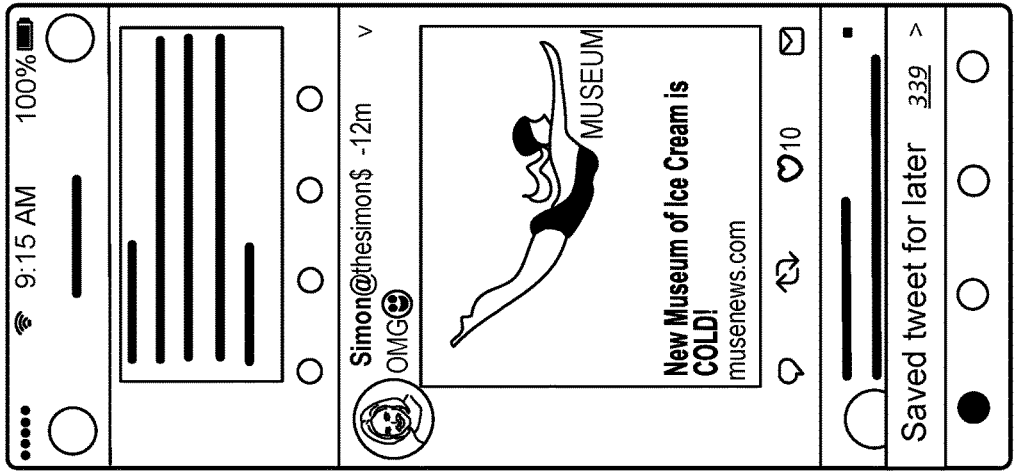
Figure 3D:
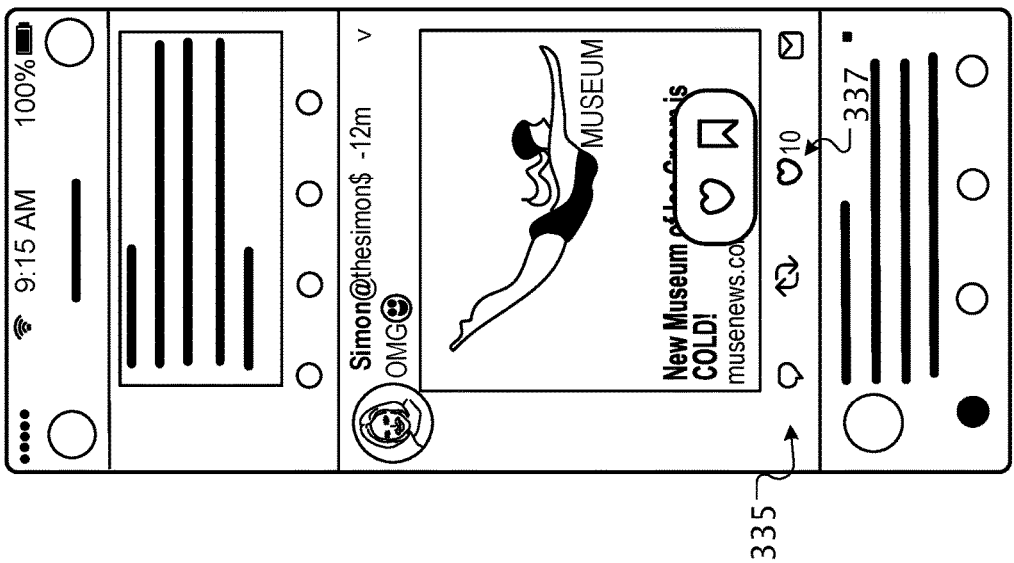

FIG. 3D is an illustration of example user interfaces for adding a message in a message feed to a custom timeline. In FIG. 3D, a first user interface 333 displays several messages in a message stream of a timeline. A number of user interface elements 335 indicating particular user actions are displayed below the content of a message, for example, to comment on the message, repeat the message, or like the message. In the example shown in FIG. 3D, the "like" element 337 represented by a heart can be held to present multiple options, in this case a like action or a bookmark action to save the message to a custom timeline. Once selected, a notification 339 can be presented as shown in the second user interface 341 indicating that the message has been saved to the custom timeline for later viewing or interaction.

Figure 3E:
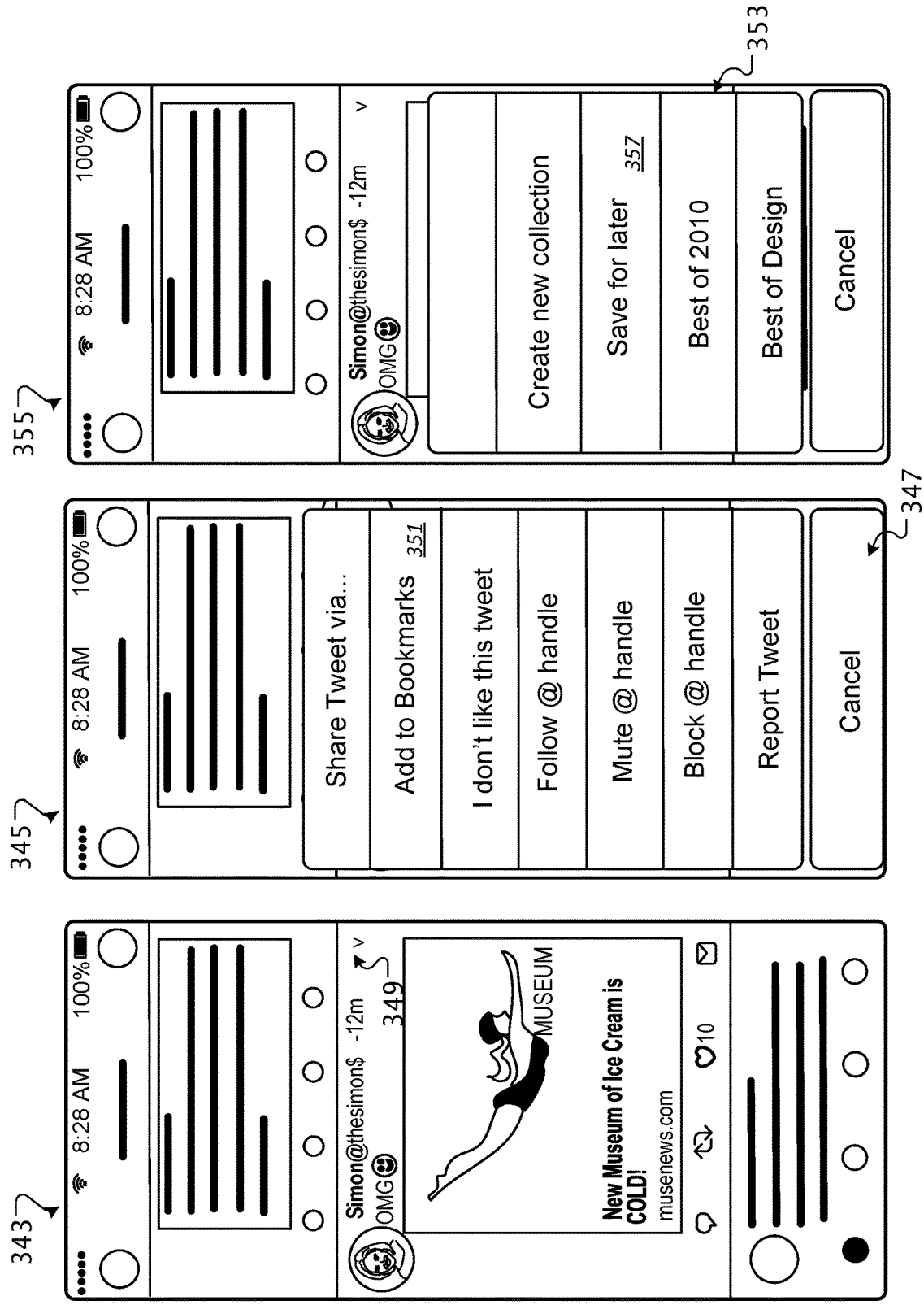

FIG. 3E is an illustration of example user interfaces for adding a message in a message feed to a custom timeline. In FIG. 3E, a first user interface 343 displays several messages in a message stream of a timeline. FIG. 3E shows a second user interface 345 including a selection menu 347. The selection menu 347 can be presented in response to a user selection of a particular user interface element. In particular, as shown in FIG. 3E, the user selects a caret 349 for a message in the message stream shown in the first user interface 343. The selection menu 347 displayed in response, as shown in the second user interface 345 includes a number of options including an option to save the message to a custom timeline, e.g., with the "add to moment/bookmarks" menu option 351. Selection of this option can present a further menu 353 associated with that selection as shown in a third user interface 355. This further menu 353 includes a save for later option 357 that the user can select to save the message to the custom timeline.

In some alternative implementations, the selection menu can be triggered by a particular user interface element displayed below the content of the message, e.g., as one of the user interface elements 325 of FIG. 3C. For example, instead of a direct message element, a sharing element can be presented. When selected, a menu including a number of sharing options can be presented including the option to save the message to a custom timeline.

Figure 3F:
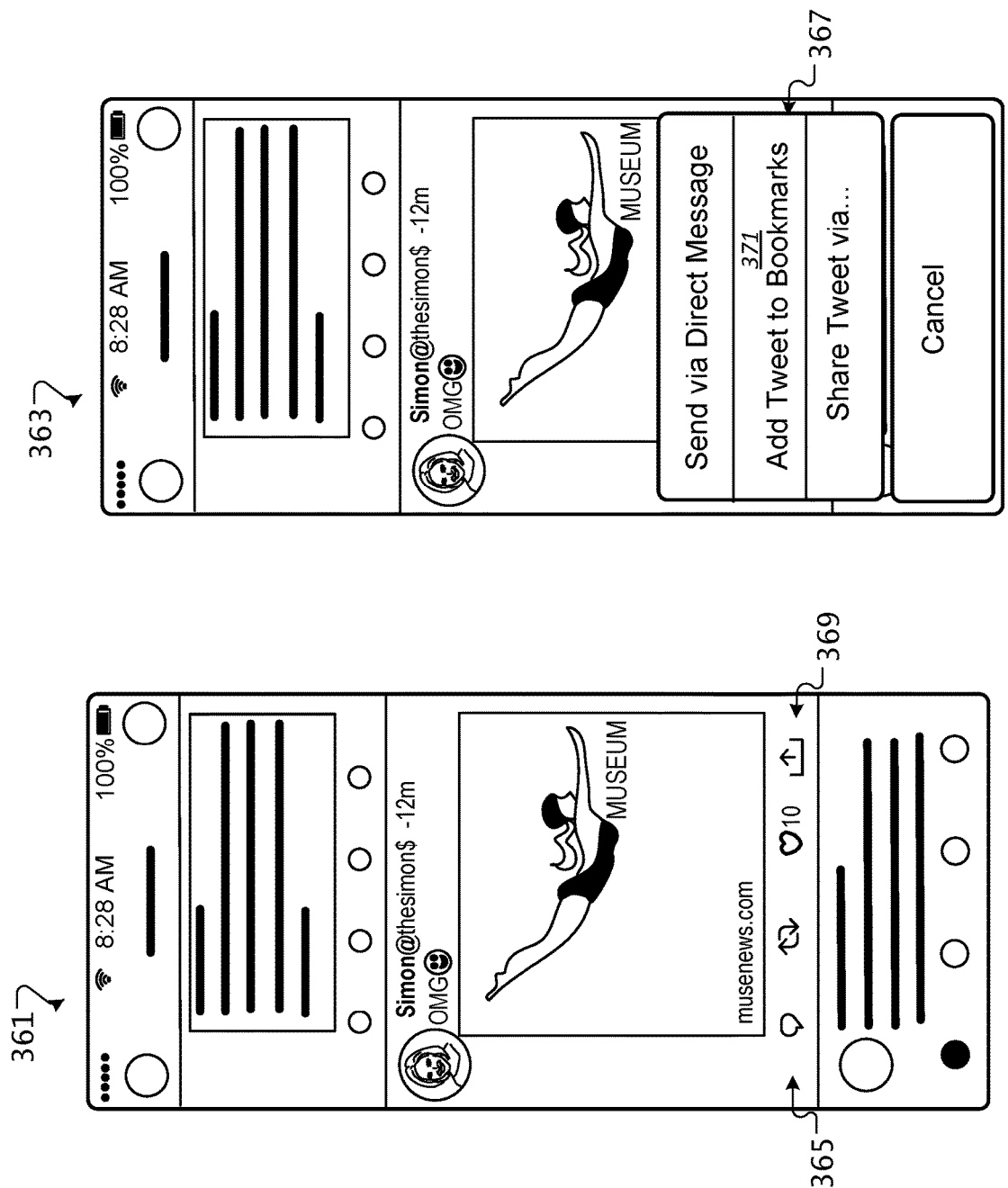

FIG. 3F is an illustration of example user interfaces for adding a message in a message feed to a custom timeline. In FIG. 3F, a first user interface 361 displays several messages in a message stream of a timeline. FIG. 3F shows a second user interface 363 including a selection menu 367. The selection menu 367 can be presented in response to a user selection of a particular user interface element. A number of user interface elements 365, shown in the first user interface 361, identify particular user actions that can be executed, for example, to comment on the message, rebroadcast or repost the message, or like the message. The user interface elements 335 includes an element 369, which causes the selection menu 367 to be presented. The selection menu 367 includes a number of options including an option to save the message to a custom timeline, e.g., with the "Add Tweet to Bookmarks" menu option 371.

Figure 3G:
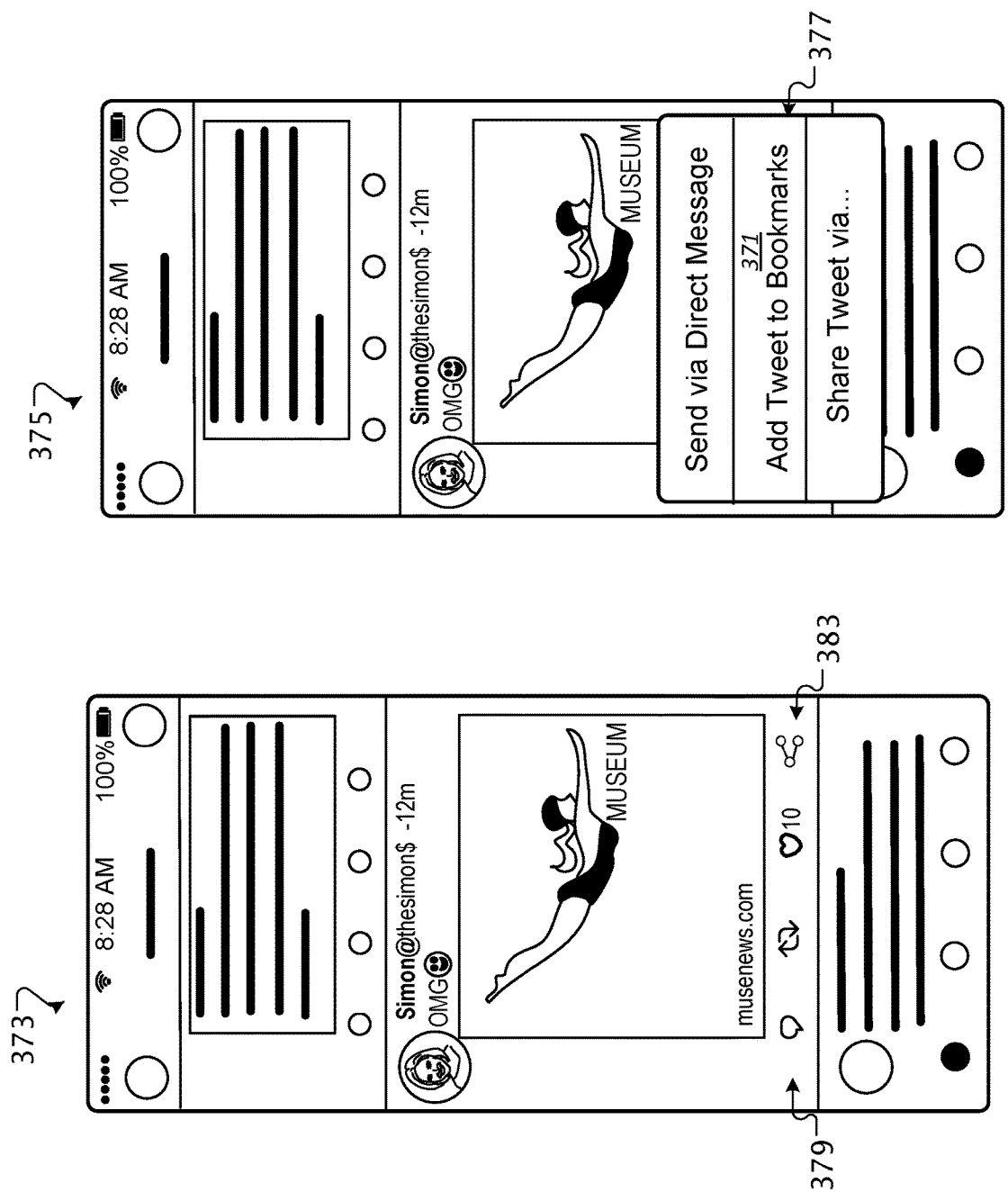

FIG. 3G is an illustration of example user interfaces for adding a message in a message feed to a custom timeline. In FIG. 3G, a first user interface 373 displays several messages in a message stream of a timeline. FIG. 3G shows a second user interface 375 including a selection menu 377. The selection menu 377 can be presented in response to a user selection of a particular user interface element. A number of user interface elements 379, shown in the first user interface 373, identify particular user actions that can be executed, for example, to comment on the message, rebroadcast or repost the message, or like the message. The user interface elements 379 includes an element 381, represented by a network icon, which causes the selection menu 377 to be presented. The selection menu 377 includes a number of options including an option to save the message to a custom timeline, e.g., with the "Add Tweet to Bookmarks" menu option 383.

Figure 4:
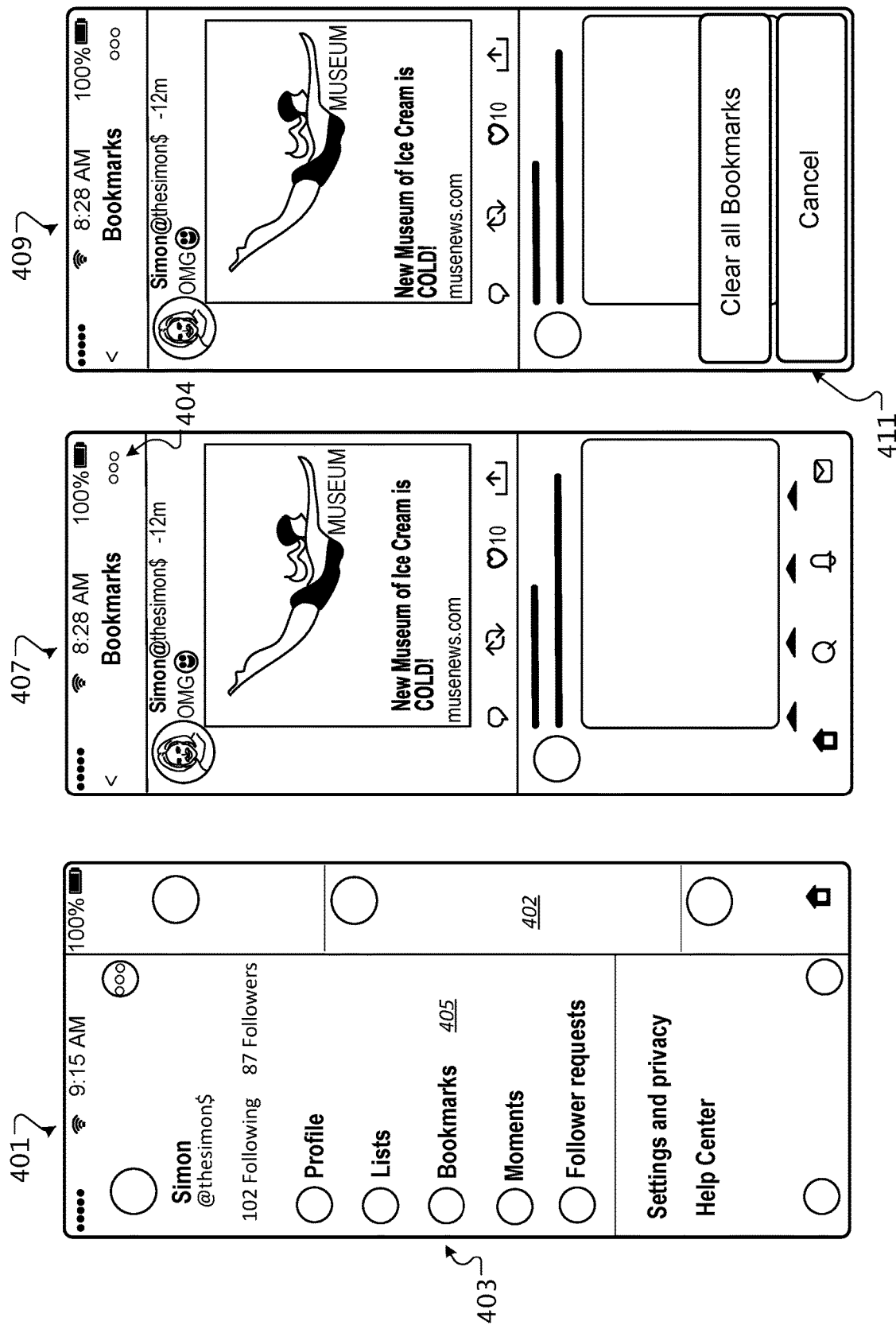
FIG. 4 is an illustration of example user interfaces for viewing saved messages.

FIG. 4 is an illustration of an example user interface for viewing saved messages. A first user interface 401 is shown in FIG. 4 that includes a menu 403. The menu 403 can be, for example, a side menu in a user interface for a messaging platform. For example, a home message stream can be presented in a user interface, e.g., of a mobile application associated with the messaging platform. Upon selection of an element, for example the user's profile picture, or by way of a touch gesture, e.g., sliding a finger across the screen to one side, the menu 403 can come into view. In some implementations, the menu 403 slides into position as pushing the home timeline substantially out of view. For example, as shown in FIG. 4, the home timeline 402 has been pushed to the edge of the user interface.

The menu 403 provides a number of user options. One of these options, as shown in FIG. 4, is the selection of a "Bookmarks" element 405. Upon selection of the bookmarks element 405, a user interface 407 can be presented that includes the messages saved to a custom timeline. The messages of the custom timeline are presented in a stream similar to the messages of the home timeline, but only include those messages that have been saved to the custom timeline by the user.

In implementations with multiple custom timelines, the selection of the "bookmarks" element can provide a sub-menu identifying one or more custom timelines, e.g., each identified as named by the user. Alternatively, in some other implementations, multiple custom timeline identifiers can be presented in the menu, which may be expandable or compressed, for example, depending on the number of custom timelines created for the user account.

The user interface 404 includes a selection element that, when selected, displays additional menu items for the custom timeline. User interface 409 illustrates an example menu 411, which allows the user to clear all saved messages to the custom timeline. In other implementations, other menu options could be included, for example, an option to share the custom timeline with one or more specified user accounts or publicly, as described in greater detail below.

The use of the custom timeline provides a number of features, which will be described below in turn:

Multiple Custom Timelines

A user can create more than one custom timeline. For example, the user can designate particular custom timelines by subject matter, e.g., to save messages pertaining to particular topics. The user can also create custom timelines based on whether the user wants a message saved to a private or public timeline as well as allowing the user to share particular custom timelines without sharing others. Each custom timeline can have its own set of parameters specifying properties of the custom timeline, for example, the particular criteria for triggering notifications associated with messages in the custom timeline.

Privacy

The custom timeline can be set to private by default. Thus, a user can save messages without an outward indication of engagement associated with the message such as a like or ReTweet. This allows users to save messages for later consumption privately. In particular, in some cases a positive indication such as a like does not convey an intended reaction to the content of the message so the message can be saved without providing an erroneous public impression. In some implementations, the user can chose to make a particular custom timeline public. In particular visibility settings can be controlled by the user to specify whether or not the custom timeline are visible.

Messages saved to a custom timeline respect the specific filtering applied with the messaging platform. For example, blocking or mute relationships are maintained across both the home timeline and any custom timeline. For example, if a user later blocks a particular account, and messages saved to a custom timeline from that account will also be blocked from view. Similarly, if a user shares a custom timeline, it won't be visible to blocked accounts.

Saving Drafts for Later

In some implementations, a user can not only save messages in their timeline, but can also save draft messages during composition and prior to posting. For example, a user may not have time to complete a message composition. The user can save the composition to a custom timeline that is private. The user can then complete the composition at a later time by accessing the custom timeline.

Searching

In some implementations, a user can perform a search in one or more custom timelines. For example, the user interface presenting the custom timeline can also include a search field. The user can submit one or more query terms and search the messages of the custom timeline.

For example, the messaging platform can use a search engine used to search the message platform generally, while restricting the search to the messages of the custom timeline, e.g., based on the message identifiers of messages saved to the custom timeline. The search can be limited to those messages in the custom timeline, or a general search can have results filtered based on the message identifiers.

Sharing

Although timelines are set as private, they can be selectively made public both generally and in the context of sharing the custom timeline with particular accounts. For example, the user can share an entire custom timeline in the body of a post that is posted to associated accounts. Alternatively, they can make their custom timeline public so that other users can view the custom timeline. For example, each custom timeline can be associated with a static network address, e.g., a web address, that can be accessed by other individuals to view the shared custom timeline as a set of saved individual messages.

In some implementations, upon sharing a particular custom timeline with a user account, the shared timeline is visible to the user account along with their own custom timelines. For example, the shared timeline can be listed in the side menu as illustrated in FIG. 4. The shared timeline can include a visual element that indicates the timeline is shared. The user can view the custom timeline to see the messages saved to by the sharing user.

Furthermore, the shared custom timeline can be updated as the sharing user adds or removes messages from the custom timeline. In some implementations, the user can set their own parameters for the shared custom timeline. For example, the user can specify notification criteria for messages in the shared timeline independent of any notification criteria set by the sharing user.

In some alternative implementations, sharing can allow equal control over the custom timeline. Such a shared custom timeline can allow both the originating user and the user to which the custom timeline is shared to add or remove messages from the custom timeline.

In some other implementations, sharing a timeline publicly includes generating an account on the messaging platform for the custom timeline. Other accounts can then follow the shared timeline. For example, when a user saves a message to a publicly shared timeline, that message can be posted to all of the following accounts.

Caching

In some implementations, when a message is saved to a custom timeline, the content of the message is cached locally, for example, to provide for offline viewing of the custom timeline. Additionally, when a message is saved to a custom timeline, any content linked to the message can also be cached. For example, a particular message can include a link to an article or embedded content such as an image or video. This content can be cached to allow offline viewing or viewing in bandwidth constrained environments. For example, a user can save messages to the custom timeline for later viewing when offline. Similarly, the user can save messages when using a higher speed or lower cost connection, e.g., wi-fi, for later viewing in environments with higher cost or lower speed, e.g., cell networks. In response to saving the message, particular content can be locally stored on the user's device. The user can access the custom timeline offline and view the locally cached content of their custom timeline.

In some implementations, a portion of the content of a saved message can be pre-fetched to improve delivery of the content. For example, if a user saves content including a video, a portion of the video content can be pre-fetched. This can provide for faster playback of the video when the user returns to consume to content.

When a message is saved by a user to a custom timeline, the system can determine whether there is any embedded media content or links. If there is embedded content, it can be cached locally for offline viewing. If there is a link, the destination page can be captured in some manner. For example, of the linked content is a particular file, e.g., a PDF or video, it can be cached. If the linked content is a web page it may be possible to cache a version of the page as it exists at the time for later offline viewing.

One example of content that can be cached for later use includes promotional content, e.g., coupons, that can be redeemed by the user. For example, some messages on the user timeline can provide coupon content that can be redeemed by the user either online, e.g., at a web site, or physically, e.g., at a store. By caching the promotional content, the user can access and redeem the content without being connected to the messaging platform. Another example of promotional content can include offers by particular third parties that require some interaction with the user. For example, a particular promotional message may allow the user to interact with a bot or other code to discover more information or be routed to an external site, e.g., for booking reservations. The user may save this message for later when they have more time available to interact with the message content.

Threading of Conversations

The saved messages are not a static representation of the message. Instead, the custom timeline is used to dynamically maintain the context surrounding public engagement with the message. Thus, for example, as the conversation around the message expands through responses to the message, this information can be associated with the message such that when viewing the custom timeline the conversation information is injected. For example, when the user returns to the custom timeline, the message statistics are current in terms of public engagement, e.g., number of likes. Additionally, portions of the conversation included with the message are presented based on the current engagement information. For example, a portion of a top ranked conversation may be displayed with the message that corresponds to the current conversation data, and not the data at the time the message was saved.

User selection of a message in the custom timeline can present one or more conversations associated with the message. The particular conversation portions shown can be based on a ranking applied to the conversations. The ranking of conversations can be based on a number of ranking criteria. For example, the number of replies within a conversation thread can be a ranking criteria, e.g., conversations with more replies can be scored higher than those with few replies. The age of the conversation or amount of time since a last response can be ranking criteria, e.g., newer conversations and/or conversations with more recent responses can be scored higher than older conversations. Social context associated with the replies can be used as a ranking criteria. For example, if a conversation includes accounts followed by the user the conversation can be scored higher. Additionally, the relationship between the user and replying accounts in the connection graph can be used to score the conversation. Other social context can include a degree of influence by particular accounts involved in the conversation. For example, accounts with a lot of followers, e.g., celebrities, can be given a higher social context score than other user accounts.

Each conversation can be scored based on one or more of the ranking criteria. The conversations can be ranked based on the scores and a specified number of top ranked conversations can be presented in response to user selection of the message.

In some implementations, a user can view more than one state of the conversation for a saved message. For example, when the message is saved, a snapshot of the conversation at that time can be captured. Additional snapshots can be captured periodically. The user can then view how the conversation for a particular message changed over time.

Populating Custom Timelines

A user can subscribe to messages posted by particular accounts of the messaging platform, e.g., by following the accounts. In some implementations, the user can designate one or more custom timelines to receive the messages posted by a subscribed account. Thus, the messages posted by that account can automatically be saved to the custom timeline without the user needing to take individual action on messages viewed, e.g., on the home timeline.

In some implementations, the user can further refine which content posted by the account is saved to the custom timeline. For example, when subscribing to an account of a news organization, the user may only be interested in particular categories of news. The user may be able to designate particular categories of content or particular tags used in the posted messages for saving to the custom timeline.

Notifications

After a user saves a message to a custom timeline they can return to view the message at a later time. In some implementations, the system provides a prompt to the user to encourage the user to view or interact with the message. The prompt can be based on time as well as a measure of engagement associated with the message.

Figure 5:
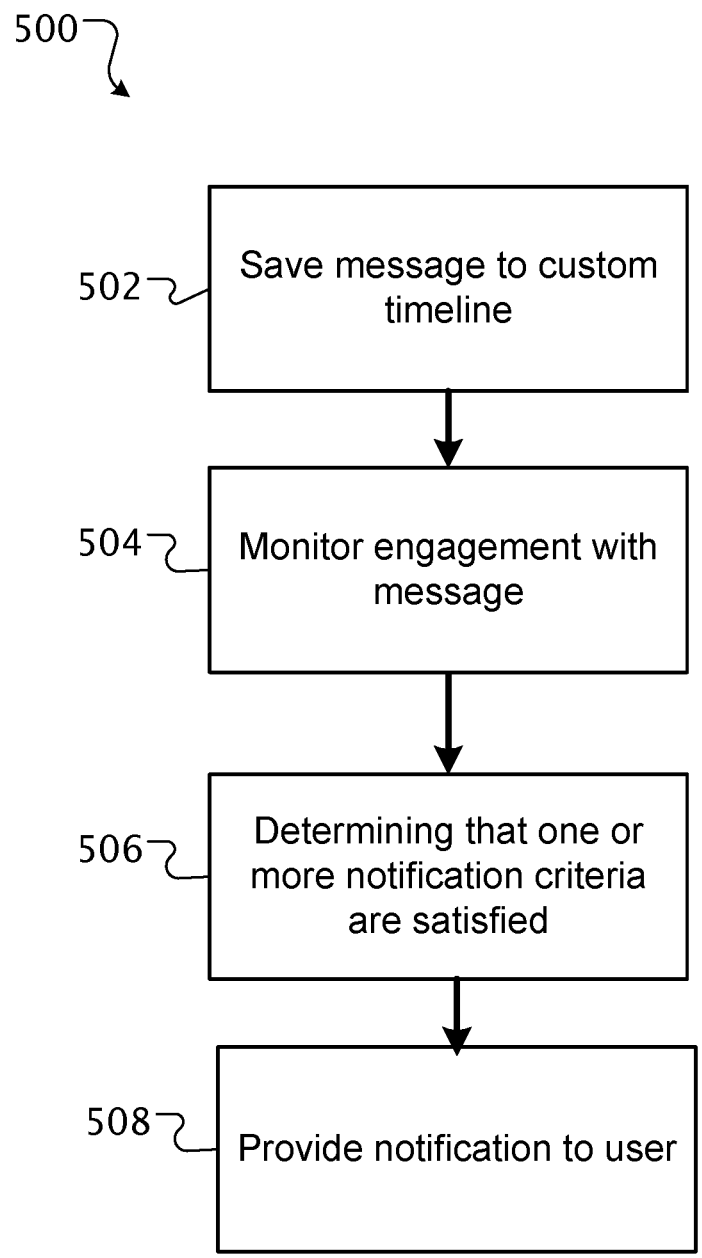
FIG. 5 is a flow diagram of an example process for providing notifications for saved messages.

FIG. 5 is a flow diagram of an example process 500 for providing notifications for saved messages. For convenience, the process 500 will be described as being performed by a system of one or more computers, located in one or more locations, and programmed appropriately in accordance with this specification. For example, a messaging platform, e.g., the messaging platform 100 of FIG. 1, appropriately programmed, can perform the process 500.

The system saves a message to a custom timeline (502). For example, a user can request that the message be saved to the custom timeline. The request can be initiated by various user interface elements as described above. In response to the user request, the system adds the message to the custom timeline of the user. The custom timeline may be, for example, a single timeline or a particular timeline of several timelines as specified by the user.

The system monitors engagement with the message (504). In some implementations, the engagement is monitored with respect to the state of engagement at the time the message was saved. The time at which the message was saved can be stored and used as a baseline for engagement monitoring. In some other implementations, the engagement is evaluated based on overall engagement since the message was posted. Engagement can include different types of interaction with the message. For example, a user can reply to the message to engage with it. Other users including the author of the message can respond to the response thereby generating a conversation. A user can also repost the message. The reposting of a message allows the user to share the message with the followers of their account. A user can also like the message or add the message to a new moment. Moments are curated stories using one or more messages. The system maintains the different engagements including, for example, maintaining a count of engagement actions as well as the content of conversations.

The system determines that one or more notification criteria are satisfied for the saved message (506). One example criteria is time since saving the message. A timestamp can be saved when the message is added to the custom timeline. The system can determine that a specified amount of time has elapsed since the user has accessed the custom timeline. In response to determining that the specified amount of time has elapsed, the system can determine a status of conversations associated with the message. The system can identify a particular conversation that began after the message was saved and that is highly ranked according to a conversation ranking process. Based on the time elapsed and identification of the conversation, the system can determine that the notification criteria are satisfied.

Another example criteria is based on the particular engagements with the message. For example, a user may save a message before there has been much engagement with the message. Large changes in the levels of engagement can be used as a criteria to notify the user and reengage them with the message. Changes in the engagement can be determined based on threshold levels of engagement that satisfy the criteria, e.g., a particular number of responses and/or reposts. Changes in the engagement can also be determined based on a rate of change in levels of engagement. For example, a specified increase in the number or size of a conversation relative to prior levels of engagement can satisfy the criteria.

Another example criteria can be particular engagements that increase a ranking of a particular conversation of the message. Conversations can be ranked, for example, based on the ranking critical described above. Particular individuals who enter a conversation can have a high social context that significantly impacts the ranking of conversations. For example, when a well-known celebrity joins a conversation it may push their conversation to the top of the ranking. This can trigger a notification criteria.

In some implementations, a prediction component can be used as a ranking criteria. The prediction component can provide predictions on whether or not the user is likely to engage further with each message based in part on the nature of the engagements with the message.

The system provides a notification to the user (508). The notification can be provided through various modes of communication including text notifications, push notifications, e-mail messages, and notifications within the application or web page interface provided by the system. For example, the notification can be incorporated into the user's home timeline or flagged at the top of their home timeline. The notification can provide information on the type of engagement or simply a suggestion to revisit the saved message or custom timeline.

In some alternative implementations, other types of notifications can be provided to users. A periodic digest can be sent by e-mail to an address associated with the user account. For example, a weekly summary of the messages saved to a custom timeline during the past week. Alternatively, the e-mail digest can identify particular messages of note, e.g., based on the occurrence of notification criteria described above that occurred during a specified time period. In some other implementations, the notification is indicated within the custom timeline. For example, when a user requests presentation of the custom timeline, messages with notifications can be presented differently within the custom timeline, e.g., with different visual features to provide an indication that there is additional information about that saved message.

In some implementations, the user can specify particular parameters for the notification criteria used to determine whether the notification criteria are satisfied. The user can specify notification criteria that apply to the entire custom timeline or just to individual messages. For example, the user can specify a level of engagement with a given message to prompt a notification for that message. In another example, the user can specify an amount of time since the message was saved, after which a notification is triggered.

In some implementations, the notification criteria can include a time to expiration associated with the saved message. For example, when saving promotional content that has a particular expiration for redemption, a notification can be triggered when the expiration time approaches, for example, a day or week before expiration. The notification can be provided by e-mail, push notification, or as a notification associated with presentation of content by the messaging system, e.g., in the home timeline.

Using Custom Timelines to Identify Promotional Content

Users may create custom timelines that are tied to particular interests, e.g., for saving messages related to sports, news, music, politics, etc. The types of custom timelines created by the users as well as the messages saved to the respective custom timelines can provide information about interests of the user. These interests can be used to identify types of promotional content to suggest to the user, e.g., in their home timeline.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, from a user of a user account of a social messaging platform, a user input to a user interface displaying a message timeline associated with the user account of the social messaging platform, the user input requesting that the social messaging platform save a first message from the message timeline,
   in response to the user input, saving the first message to a custom timeline of the user account, wherein the custom timeline is distinct from the message timeline, and wherein saving the message to the custom timeline includes associating with the custom timeline an identifier that identifies the first message;
   responsive to saving the first message to the custom timeline, monitoring respective engagement values representing subsequent engagements by one or more other accounts of the social messaging platform with the first message;
   determining whether a particular notification criterion associated with a respective type of engagement is satisfied, comprising:
      determining that at least one of (i) a rate of change in one of the respective engagement values associated with the first message, or (ii) a change of ranking of the first message based on a particular ranking criterion in response to one or more engagements with the first message by other particular user accounts, satisfies a respective threshold value; and
   in response to determining that the particular notification criterion is satisfied, providing a notification to the user account, wherein the notification is associated with the first message saved in the custom timeline and configured to prompt the user to revisit the custom timeline.

2. The method of claim 1, further comprising:
   responsive to a user request to view the custom timeline, providing the custom timeline for presentation to the user, wherein providing the custom timeline includes retrieving content associated with identifiers for one or more messages saved to the custom timeline and assembling an ordered message stream comprising the one or more messages saved to the custom timeline.

3. The method of claim 1, comprising:
   receiving user input specifying notification parameters for messages saved to the custom timeline; and
   determining whether the monitored respective engagements values satisfy the particular notification criterion according to the user specified notification parameters.

4. The method of claim 1, further comprising:
   receiving a request to share the custom timeline with a specified account of the social messaging platform; and
   sharing, with the specified account, the custom timeline including the first message and all other messages saved to the custom timeline.

5. The method of claim 4, wherein sharing the custom timeline provides equal modification rights to the custom timeline to the specified account as to the user.

6. The method of claim 1, wherein the request to save the message comprises a request to subscribe to messages posted by an authoring account of the message, the subscription request designating the custom timeline as a destination for automatically saving future messages posted by the authoring account.

7. The method of claim 1, wherein the social messaging platform dynamically maintains a context of each saved message, each context for a respective message including engagements with the message by one or more accounts of the social messaging platform.

8. The method of claim 7, wherein in response to a request to display the custom timeline, presenting the first message with current engagement information, and wherein, in response to a user selection of the first message within the custom timeline, presenting one or more replies to the first message based on the current engagement information.

9. A system comprising:
a user device; and
one or more computers configured to interact with the user device and to perform operations comprising:
receiving, from a user of a user account of a social messaging platform, a user input to a user interface displaying a message timeline associated with the user account of the social messaging platform, the user input requesting that the social messaging platform save a first message from the message timeline,
in response to the user input, saving the first message to a custom timeline of the user account, wherein the custom timeline is distinct from the message timeline, wherein saving the message to the custom timeline includes associating with the custom timeline an identifier that identifies the first message;
responsive to saving the first message to the custom timeline, monitoring respective engagement values representing subsequent engagements by one or more other accounts of the social messaging platform with the first message;
determining whether a particular notification criterion associated
determining that at east one of (i) a rate of change in one of the respective engagement values associated with the first message, or (ii) a change of ranking of the first message based on a particular ranking criterion in response to one or more engagements with the first message by other particular user accounts, satisfies a respective threshold value; and
in response to determining that the particular notification criterion is satisfied, providing a notification to the user account, wherein the notification is associated with the first message saved in the custom timeline and configured to prompt the user to revisit the custom timeline.

10. The system of claim 9, wherein the one or more computers are configured perform operations further comprising:
responsive to a user request to view the custom timeline, providing the custom timeline for presentation to the user, wherein providing the custom timeline includes retrieving content associated with identifiers for one or more messages saved to the custom timeline and assembling an ordered message stream comprising the one or more messages saved to the custom timeline.

11. The system of claim 9, wherein the one or more computers are configured perform operations further comprising:
receiving user input specifying notification parameters for messages saved to the custom timeline; and
determining whether the monitored respective engagements values satisfy the particular notification criterion according to the user specified notification parameters.

12. The system of claim 9, wherein the one or more computers are configured perform operations further comprising:
receiving a request to share the custom timeline with a specified account of the social messaging platform; and
sharing, with the specified account, the custom timeline including the first message and all other messages saved to the custom timeline.

13. The system of claim 12, wherein sharing the custom timeline provides equal modification rights to the custom timeline to the specified account as to the user.

14. The system of claim 9, wherein the request to save the message comprises a request to subscribe to messages posted by an authoring account of the message, the subscription request designating the custom timeline as a destination for automatically saving future messages posted by the authoring account.

15. The system of claim 9, wherein the social messaging platform dynamically maintains a context of each saved message, each context for a respective message including engagements with the message by one or more accounts of the social messaging platform.

16. The system of claim 15, wherein in response to a request to display the custom timeline, presenting the first message with current engagement information, and wherein, in response to a user selection of the first message within the custom timeline, presenting one or more replies to the first message based on the current engagement information.

17. One or more non-transitory computer storage media encoded with computer program instructions that when executed by one or more computers cause the one or more computers to perform operations comprising:
receiving, from a user of a user account of a social messaging platform, a user input to a user interface displaying a message timeline associated with the user account of the social messaging platform, the user input requesting that the social messaging platform save a first message from the message timeline,
in response to the user input, saving the first message to a custom timeline of the user account, wherein the custom timeline is distinct from the message timeline, wherein saving the message to the custom timeline includes associating with the custom timeline an identifier that identifies the first message;
responsive to saving the first message to the custom timeline, monitoring respective engagement values representing subsequent engagements by one or more other accounts of the social messaging platform with the first message;
determining whether a particular notification criterion associated with a respective type of engagement is satisfied, comprising:
determining the at least one of (i) a rate of change in one of the respective engagement values associated with the first message, or (ii) a change of ranking of the first message based on a particular ranking criterion in response to one or more engagements by other particular user accounts with the first message, satisfies a respective threshold value; and
in response to determining that the particular notification criterion is satisfied, providing a notification to the user account, wherein the notification is associated with the first message saved in the custom timeline and configured to prompt the user to revisit the custom timeline.

18. The one or more non-transitory computer storage media of claim 17, comprising instructions that when executed by the one or more computers cause the one or more computers to perform operations further comprising:
responsive to a user request to view the custom timeline, providing the custom timeline for presentation to the user, wherein providing the custom timeline includes retrieving content associated with identifiers for one or more messages saved to the custom timeline and assembling an ordered message stream comprising the one or more messages saved to the custom timeline.

19. The one or more non-transitory computer storage media of claim 17, comprising instructions that when executed by the one or more computers cause the one or more computers to perform operations further comprising:
receiving user input specifying notification parameters for messages saved to the custom timeline; and
determining whether the monitored respective engagements values satisfy the particular notification criterion according to the user specified notification parameters.

20. The one or more non-transitory computer storage media of claim 17, comprising instructions that when executed by the one or more computers cause the one or more computers to perform operations further comprising:
receiving a request to share the custom timeline with a specified account of the social messaging platform; and
sharing, with the specified account, the custom timeline including the first message and all other messages saved to the custom timeline.

21. The one or more non-transitory computer storage media of claim 20, wherein sharing the custom timeline provides equal modification rights to the custom timeline to the specified account as to the user.

22. The one or more non-transitory computer storage media of claim 17, wherein the request to save the message comprises a request to subscribe to messages posted by an authoring account of the message, the subscription request designating the custom timeline as a destination for automatically saving future messages posted by the authoring account.

23. The one or more non-transitory computer storage media of claim 17, wherein the social messaging platform dynamically maintains a context of each saved message, each context for a respective message including engagements with the message by one or more accounts of the social messaging platform.

24. The one or more non-transitory computer storage media of claim 23, wherein in response to a request to display the custom timeline, presenting the first message with current engagement information, and wherein, in response to a user selection of the first message within the custom timeline, presenting one or more replies to the first message based on the current engagement information.

* * * * *